United States Patent [19]
Japuntich et al.

[11] Patent Number: 5,325,892
[45] Date of Patent: Jul. 5, 1994

[54] UNIDIRECTIONAL FLUID VALVE

[75] Inventors: Daniel A. Japuntich, St. Paul; Vaughn B. Grannis, Inver Grove Heights; Harold J. Seppala, St. Paul; Anthony B. Ferguson, Woodbury, all of Minn.

[73] Assignee: Minnesota Mining and Manufacturing Company, St. Paul, Minn.

[21] Appl. No.: 981,244

[22] Filed: Nov. 25, 1992

Related U.S. Application Data

[63] Continuation-in-part of Ser. No. 891,289, May 29, 1992, abandoned.

[51] Int. Cl.$^5$ .............................................. F16K 15/16
[52] U.S. Cl. .................................................... 137/855
[58] Field of Search ................. 137/855, 856, 857, 858

[56] References Cited

U.S. PATENT DOCUMENTS

| | | | |
|---|---|---|---|
| 2,864,394 | 5/1954 | Hempel | 137/107 |
| 2,999,498 | 9/1961 | Matheson | 128/146 |
| 3,191,618 | 6/1965 | McKim | 137/855 |
| 4,414,973 | 11/1983 | Matheson et al. | 128/206.15 |
| 4,456,016 | 6/1984 | Nowacki et al. | 128/725 |
| 4,630,604 | 12/1986 | Montesi | 128/206.15 |
| 4,631,376 | 12/1986 | Leone | 200/306 |
| 4,749,003 | 6/1988 | Leason | 137/854 |
| 4,759,758 | 7/1988 | Gabbay | 623/2 |
| 4,838,262 | 6/1989 | Katz | 128/205.24 |
| 4,888,009 | 12/1989 | Lederman et al. | 623/2 |
| 4,934,362 | 6/1990 | Braun | 128/207.12 |
| 4,958,633 | 9/1990 | Angell | 128/201.19 |
| 4,972,765 | 11/1990 | Dixon | 98/2.18 |
| 4,974,586 | 12/1990 | Wandel et al. | 128/206.28 |
| 4,981,134 | 1/1991 | Courtney | 128/207.12 |

FOREIGN PATENT DOCUMENTS 4029939 3/1992 Fed. Rep. of Germany .......... A62B 9/02

Primary Examiner—Robert G. Nilson
Attorney, Agent, or Firm—Gary L. Griswold; Walter N. Kirn; Karl G. Hanson

[57] ABSTRACT

An exhalation valve 14 for a filtering face mask 10 has a flexible flap 24 that makes contact with a curved seal ridge 30 of a valve seat 26 when the valve 14 is in the closed position. The curvature of the seal ridge 30 corresponds to a deformation curve exhibited by the flexible flap 24 when secured as a cantilever at one end and exposed at its free portion to a uniform force and/or a force of at least the weight of the free portion of the flexible flap. A seal ridge curvature corresponding to a flexible flap exposed to uniform force allows the flexible flap 24 to exert a generally uniform pressure on the seal ridge to provide a good seal. A seal ridge curvature corresponding to a flexible flap exposed to a force of at least the weight of the flap's free portion allows the flexible flap 24 to be held in an abutting relationship to the seal ridge 30 under any static orientation by a minimum amount of force, thereby providing a face mask 10 with an extraordinary low pressure drop during an exhalation.

16 Claims, 2 Drawing Sheets

UNIDIRECTIONAL FLUID VALVE

This is a continuation-in-part of U.S. patent application Ser. No. 07/891,289 filed May 29, 1992, now abandoned the disclosure of which is incorporated here by reference.

TECHNICAL FIELD

This invention pertains to (i) a unidirectional fluid valve that can be used as an exhalation valve for a filtering face mask, (ii) a filtering face mask that employs an exhalation valve, and (iii) a method of making a unidirectional fluid valve.

BACKGROUND OF THE INVENTION

Exhalation valves have been used on filtering face masks for many years and have been disclosed in, for example, U.S. Pat. Nos. 4,981,134, 4,974,586, 4,958,633, 4,934,362, 4,838,262, 4,630,604, 4,414,973, and 2,999,498. U.S. Pat. No. 4,934,362 (the '362 patent), in particular, discloses a unidirectional exhalation valve that has a flexible flap secured to a valve seat, where the valve seat has a rounded seal ridge with a parabolic profile. The elastomeric flap is secured to the valve seat at the apex of the parabolic curve, and rests on the rounded seal ridge when the valve is in a closed position. When a wearer of a face mask exhales, the exhaled air lifts the free end of the flexible flap off the seal ridge, thereby allowing the exhaled air to be displaced from the interior of the face mask. The '362 patent discloses that an exhalation valve of this construction provides a significantly lower pressure drop for a filtering face mask.

SUMMARY OF THE INVENTION

In a first aspect, the present invention provides a unidirectional fluid valve that comprises a flexible flap having a first portion and a second portion, the first portion being attached to a valve seat, the valve seat having an orifice and a seal ridge that has a concave curvature when viewed from a side elevation, the flexible flap making contact with the concave curvature of the seal ridge when a fluid is not passing through the orifice, the second portion of the flexible flap being free to be lifted from the seal ridge when a fluid is passing through the orifice, wherein the concave curvature of the seal ridge corresponds to a deformation curve exhibited by the second portion of the flexible flap when exposed to a uniform force, a force having a magnitude equal to a mass of the second portion of the flexible flap multiplied by at least one gravitational unit of acceleration, or a combination thereof.

In a second aspect, the present invention provides a filtering face mask that comprises:

(a) a mask body adapted to fit over the nose and mouth of a person; and (b) an exhalation valve attached to the mask body, which exhalation valve comprises:

(1) a valve seat having (i) an orifice through which a fluid can pass, and (ii) a seal ridge circumscribing the orifice and having a concave curvature when viewed from a side elevation, the apex of the concave curvature of the seal ridge being located upstream to fluid flow through the orifice relative to outer extremities of the concave curvature; and (2) a flexible flap having a first and second portions, the first portion being attached to the valve seat outside a region encompassed by the orifice, and the second portion assuming the concave curvature of the seal ridge when the valve is in a closed position and being free to be lifted from the seal ridge when a fluid is passing through the orifice.

In a third aspect, the present invention provides a filtering face mask that comprises:

(a) a mask body that has a shaped adapted to fit over the nose and mouth of a person, the mask body having a filter media for removing contaminants from a fluid that passes through the mask body, there being an opening in the mask body that permits a fluid to exit the mask body without passing through the filter media, the opening being positioned on the mask body such that the opening is substantially directly in front of a wearer's mouth when the filtering face mask is placed on a wearer's face over the nose and mouth; and (b) an exhalation valve attached to the mask body at the location of the opening, the exhalation valve having a flexible flap and a valve seat that includes an orifice and a seal ridge, the flexible flap being attached to the valve seat at a first end and resting upon the seal ridge when the exhalation valve is in a closed position, the flexible flap having a second free-end that is lifted from the seal ridge when a fluid is passing through the exhalation valve;

wherein, the fluid-permeable face mask can demonstrate a negative pressure drop when air is passed into the filtering face mask with a velocity of at least 0.8 m/s under a normal exhalation test.

In a fourth aspect, the present invention provides a method of making a unidirectional fluid valve, which comprises:

(a) providing a valve seat that has an orifice circumscribed by a seal ridge, the seal ridge having a concave curvature when viewed from a side elevation, the concave curvature corresponding to a deformation curve demonstrated by a flexible flap that has a first portion secured to a surface at as a cantilever and has a second, non-secured portion exposed to a uniform force, a force having a magnitude equal to the mass of the second portion of the flexible flap multiplied by at least one gravitational unit of acceleration, or a combination thereof; and (b) attaching a first portion of the flexible flap to the valve seat such that (i) the flexible flap makes contact with the seal ridge when a fluid is not passing through the orifice, and (ii) the second portion of the attached flexible flap is free to be lifted from the seal ridge when a fluid is passing through the orifice.

Filtering face masks should be safe and comfortable to wear. To be safe, the face mask should not allow contaminants to enter the interior of the face mask through the exhalation valve, and to be comfortable, the face mask should displace as large a percentage of exhaled air as possible through the exhalation valve with minimal effort. The present invention provides a safe exhalation valve by having a flexible flap that makes a substantially uniform seal to the valve seat under any orientation of the exhalation valve. The present invention helps relieve discomfort to the wearer by (1) minimizing exhalation pressure inside a filtering face mask, (2) purging a greater percentage of exhaled air through the exhalation valve (as opposed to having the exhaled air pass through the filter media), and under some circumstances (3) providing a negative pressure inside a filtering face mask during exhalation to create a net flow of cool, ambient air into the face mask.

In the first and fourth aspects of the present invention, a unidirectional fluid valve is provided that enables a flexible flap to exert a substantially uniform force on a seal ridge of the valve seat. The substantially uniform force is obtained by attaching a first portion of a flexible flap to a surface and suspending a second or free portion of the flexible flap as a cantilever beam. The second or free portion of the flexible flap is then deformed under computer simulation by applying a plurality of force vectors of the same magnitude to the flexible flap at directions normal to the curvature of the flexible flap. The second portion of the flexible flap takes on a particular curvature, referred to as the deformation curve. The deformation curve is traced, and that tracing is used to define the curvature of the seal ridge of the valve seat. A valve seat of this curvature prevents the flexible flap from buckling and from making slight or no contact with the seal ridge at certain locations and making too strong a contact at other locations. This uniform contacting relationship allows the valve to be safe by precluding the influx of contaminants.

In the first and fourth aspects of the present invention, a unidirectional fluid valve is also provided which minimizes exhalation pressure. This advantage is accomplished by achieving the minimum force necessary to keep the flexible flap in the closed position under any orientation. The minimum flap closure force is obtained by providing an exhalation valve with a valve seat that has a seal ridge with a concave curvature that corresponds to a deformation curve exhibited by the flexible flap when it is secured as a cantilever at one end and bends under its own weight. A seal ridge corresponding to this deformation curve allows the exhalation valve to remain closed when completely inverted but also permits it to be opened with minimum force to thereby lower the pressure drop across the face mask.

In the second aspect of the present invention, a filtering face mask is provided with an exhalation valve that can demonstrate a lower airflow resistance force, which enables the exhalation valve to open easier. This advantage has been accomplished in the present invention by securing the flexible flap to the valve seat outside the region encompassed by the valve orifice. An exhalation valve of this construction allows the flexible flap to be lifted more easily from the curved seal ridge because a greater moment arm is obtained when the flexible flap is mounted to the valve seat outside the region encompassed by the orifice. A further advantage of an exhalation valve of this construction is that it can allow the whole orifice to be open to airflow during an exhalation.

In addition to the above advantages, this invention allows a greater percentage of exhaled air to be purged through the exhalation valve, and, after an initial positive pressure to open the valve, allows the pressure inside the filtering face mask to decrease and in some cases become negative during exhalation. These two attributes have been achieved by (i) positioning the exhalation valve of this invention on a filtering face mask substantially directly opposite to where the wearer's mouth would be when the face mask is being worn, and (ii) defining a preferred cross-sectional area for the orifice of the exhalation valve. When an exhalation valve of this invention has an orifice with a cross-sectional area greater than about 2 square centimeters ($cm^2$) when viewed from a plane perpendicular to the direction of fluid flow and the exhalation valve is located on the filtering face mask substantially directly in front of the wearer's mouth, lower and negative pressures can be developed inside of the filtering face mask during normal exhalation.

In this invention, at least 40 percent of the exhaled air can exit the face mask through the exhalation valve at a positive pressure drop of less than 24.5 pascals at low exhalation air velocities and volume airflows greater than 40 liters per minute (l/min). At higher exhalation air velocities (such as with the wearer's lips pursed), a negative pressure may be developed inside of the filtering face mask. In the third aspect of the present invention, a filtering face mask is provided that demonstrates a negative pressure. The negative pressure allows a volume of air greater than one hundred percent of the exhaled air to pass out through the exhalation valve, and further enables ambient air to pass inwardly through the filtering media when a person is exhaling. This creates a situation where upon the next inhalation the wearer breathes in cooler, fresher, ambient air of lower humidity than the wearer's breath and of higher oxygen content. The influx of ambient air is referred to as aspiration, and it provides the wearer of the face mask with improved comfort. The aspiration effect also reduces the fogging of eyewear because less exhaled air exits the face mask through the filter media. The discovery of the aspiration effect was very surprising.

The above novel features and advantages of the present invention are more fully shown and described in the drawings and the following detailed description, where like reference numerals are used to represent similar parts. It is to be understood, however, that the drawings and detailed description are for the purposes of illustration only and should not be read in a manner that would unduly limit the scope of this invention.

DETAILED DESCRIPTION OF PREFERRED EMBODIMENTS

In describing preferred embodiments of this invention, specific terminology will be used for the sake of clarity. The invention, however, is not intended to be limited to the specific terms so selected, and it is to be understood that each term so selected includes all the technical equivalents that operate similarly.

Figure 1:
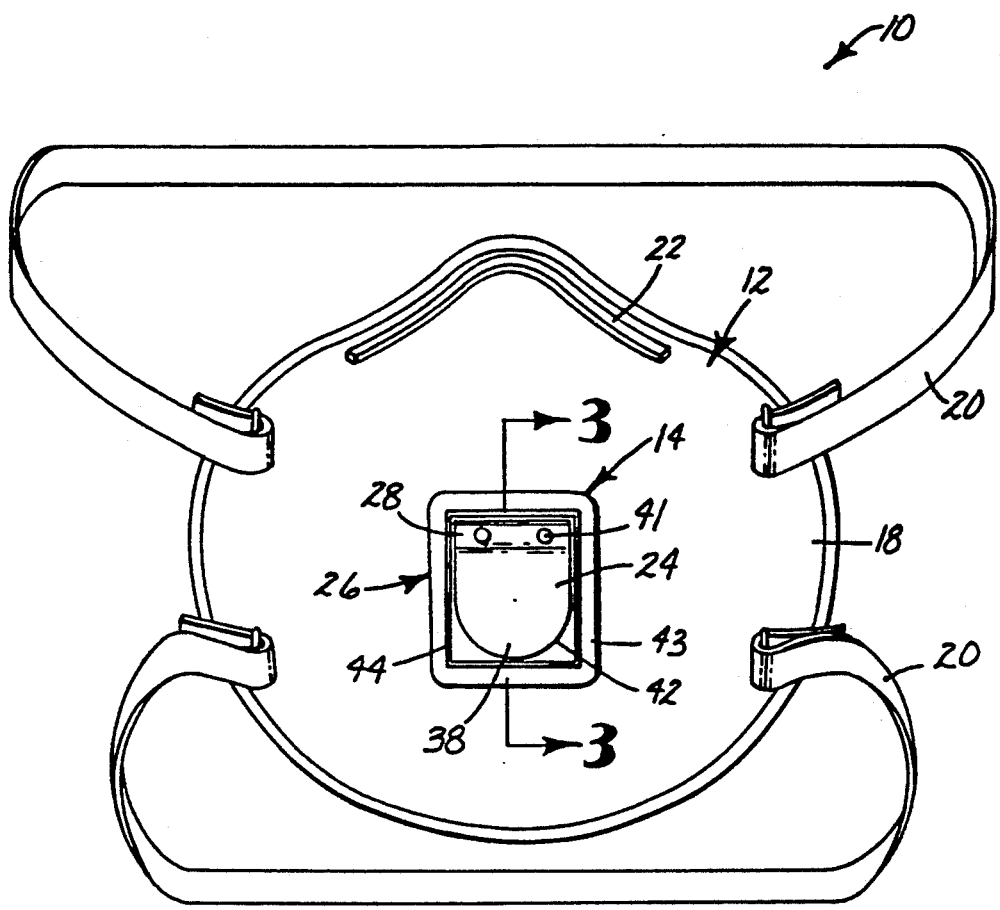
FIG. 1 is a front view of a filtering face mask 10 in accordance with the present invention.

FIG. 1 illustrates a filtering face mask 10 according to the present invention. Filtering face mask 10 has a cup-shaped mask body 12 to which an exhalation valve 14 is attached. Mask body 12 is provided with an opening (not shown) through which exhaled air can exit without having to pass through the filtration layer. The preferred location of the opening on the mask body 12 is directly in front of where the wearer's mouth would be when the mask is being worn. Exhalation valve 14 is attached to mask body 12 at the location of that opening. With the exception of the location of the exhalation valve 14, essentially the entire exposed surface of mask body 12 is fluid permeable to inhaled air.

Figure 2:
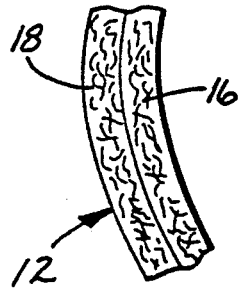
FIG. 2 is a partial cross-section of the face mask body 12 of FIG. 1.

Mask body 12 can be of a curved, hemispherical shape or may take on other shapes as so desired. For example, the mask body can be a cup-shaped mask having a construction like the face mask disclosed in U.S. Pat. No. 4,827,924 to Japuntich. Mask body 12 may comprise an inner shaping layer 16 and an outer filtration layer 18 (FIG. 2). Shaping layer 16 provides structure to the mask 10 and support for filtration layer 198. Shaping layer 16 may be located on the inside and/or outside of filtration layer 18 and can be made, for example, from a nonwoven web of thermally-bondable fibers molded into a cup-shaped configuration. The shaping layer can be molded in accordance with known procedures. Although a shaping layer 16 is designed with the primary purpose of providing structure to the mask and support for a filtration layer, shaping layer 16 also may provide for filtration, typically for filtration of larger particles. To hold the face mask snugly upon the wearer's face, mask body can have straps 20, tie strings, a mask harness, etc. attached thereto. A pliable dead soft band 22 of metal such as aluminum can be provided on mask body 12 to allow it to be shaped to hold the face mask in a desired fitting relationship on the nose of the wearer.

When a wearer of a filtering face mask 10 exhales, exhaled air passes through the mask body 12 and exhalation valve 14. Comfort is best obtained when a high percentage of the exhaled air passes through exhalation valve 14, as opposed to the filter media of mask body 12. Exhaled air is expelled through valve 14 by having the exhaled air lift flexible flap 24 from valve seat 26. Flexible flap 24 is attached to valve seat 26 at a first portion 28 of flap 24, and the remaining circumferential edge of flexible flap 24 is free to be lifted from valve seat 26 during exhalation. As the term is used herein, "flexible" means the flap can deform or bend in the form of a self-supporting arc when secured at one end as a cantilever and viewed from a side elevation (see e.g., FIG. 5). A flap that is not self-supporting will tend to drape towards the ground at about 90 degrees from the horizontal.

Figure 3:
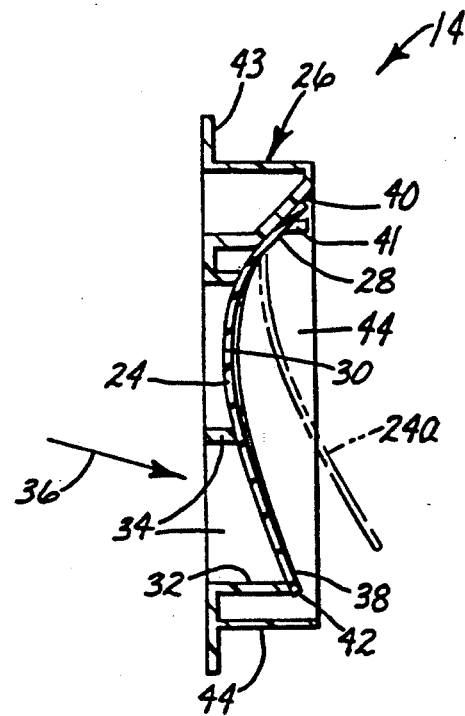
FIG. 3 is a cross-sectional view of an exhalation valve 14 taken along lines 3—3 of FIG. 1.
Figure 4:
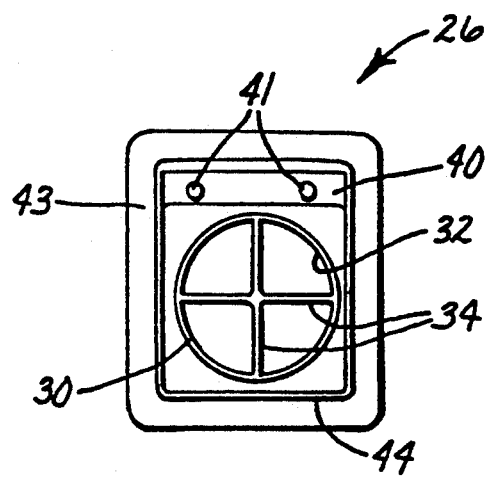
FIG. 4 is a front view of a valve seat 18 in accordance with the present invention.

As shown in FIGS. 3 and 4, valve seat 26 has a seal ridge 30 to which the flexible flap 24 makes contact when a fluid is not passing through the valve 14. An orifice 32 is located radially inward to seal ridge 30 and is circumscribed thereby. Orifice 32 can have cross-members 34 that stabilize seal ridge 30 and ultimately valve 14. The cross-members 34 also can prevent flexible flap 24 from inverting into orifice 32 under reverse air flow, for example, during inhalation. When viewed from a side elevation, the surface of the cross-members 34 is slightly recessed beneath (but may be aligned with) seal ridge 30 to ensure that the cross members do not lift the flexible flap 24 off seal ridge 30 (see FIG. 3).

Seal ridge 30 and orifice 32 can take on any shape when viewed from a plane perpendicular to the direction of fluid flow (FIG. 4). For example, seal ridge 30 and orifice 32 may be square, rectangular, circular, elliptical, etc. The shape of seal ridge 30 does not have to correspond to the shape of orifice 32. For example, the orifice 32 may be circular and the seal ridge may be rectangular. It is only necessary that the seal ridge 30 circumscribe the orifice 32 to prevent the undesired influx of contaminates through orifice 32. The seal ridge 30 and orifice 32, however, preferably have a circular cross-section when viewed against the direction of fluid flow. The opening in the mask body 12 preferably has a cross-sectional area at least the size of orifice 32. The flexible flap 24, of course, covers an area larger than orifice 32 and is at least the size of the area circumscribed by seal ridge 30. Orifice 32 preferably has a cross-sectional area of 2 to 6 $cm^2$, and more preferably 3 to 4 $cm^2$. An orifice of this size provides the face mask with an aspiration effect to assist in purging warm, humid exhaled air. An upper limit on orifice size can be important when aspiration occurs because a large orifice provides a possibility that ambient air may enter the face mask through the orifice of the exhalation valve, rather than through the filter media, thereby creating unsafe breathing conditions.

FIG. 3 shows flexible flap 24 in a closed position resting on seal ridge 30 and in an open position by the dotted lines 24a. Seal ridge 30 has a concave curvature when viewed in the direction of FIG. 3. This concave curvature, as indicated above, corresponds to the deformation curve displayed by the flexible flap when it is secured as a cantilever beam. The concave curvature shown in FIG. 3 is inflection free, and preferably extends along a generally straight line in the side-elevational direction of FIG. 3. A fluid passes through valve 14 in the direction indicated by arrow 36. The apex of the concave curvature is located upstream to fluid flow through the annular orifice 32 relative to the outer extremities of the concave curvature. Fluid 36 passing through annular orifice 32 exerts a force on flexible flap 24 causing free end 38 of flap 24 to be lifted from seal ridge 30 of valve seat 26 making valve 14 open. Valve 14 is preferably oriented on face mask 10 such that the free end 38 of flexible flap 24 is located below secured end 28 when the mask 10 is positioned upright as shown in FIG. 1. This enables exhaled air to be deflected downwards so as to prevent moisture from condensing on the wearer's eyewear.

As shown in FIGS. 3 and 4, valve seat 26 has a flap-retaining surface 40 located outside the region encompassed by orifice 32 beyond an outer extremity of seal ridge 30. Flap-retaining surface 40 preferably traverses valve 14 over a distance at least as great as the width of orifice 32. Flap-retaining surface 40 may extend in a straight line in the direction to which surface 40 traverses the valve seat 26. Flap-retaining surface 40 can have pins 41 for holding flexible flap 24 in place. When pins 41 are employed as part of a means for securing flexible flap 24 to valve seat 26, flexible flap 24 would be provided with corresponding openings so that flexible flap 24 can be positioned over pins 41 and preferably can be held in an abutting relationship to flap-retaining surface 40. Flexible flap 24 also can be attached to the flap-retaining surface by sonic welding, an adhesive, mechanical clamping, or other suitable means.

Flap-retaining surface 40 preferably is positioned on valve seat 40 to allow flexible flap 24 to be pressed in an abutting relationship to seal ridge 30 when a fluid is not passing through orifice 32. Flap-retaining surface 40 can be positioned on valve seat 26 as a tangent to the curvature of the seal ridge 30 when viewed from a side elevation (FIG. 3). The flap-retaining surface 40 is spaced from orifice 32 and seal ridge 30 to provide a moment arm that assists in the deflection of the flap during an exhalation. The greater the spacing between the flap-retaining surface 40 and the orifice 32, the greater the moment arm and the lower the torque of the flexible flap 24 and thus the easier it is for flexible flap 24 to open when a force from exhaled air is applied to the same. The distance between surface 40 and orifice 32, however, should not be so great as to cause the flexible flap to dangle freely. Rather, the flexible flap 24 is pressed towards seal ridge 30 so that there is a substantially uniform seal when the valve is in the closed position. The distance between the flap-retaining surface and nearest portion of orifice 32, preferably, is about 1 to 3.5 mm, more preferably 1.5 to 2.5 mm.

The space between orifice 32 and the flap-retaining surface 40 also provides the flexible flap 24 with a transitional region that allows the flexible flap 24 to more easily assume the curve of the seal ridge 30. Flexible flap 24 is preferably sufficiently supple to account for tolerance variations. Flap-retaining surface 40 can be a planar surface or it can be a continuous extension of curved seal ridge 30; that is, it can be a curved extension of the deformation curve displayed by the flexible flap. As such, however, it is preferred that flexible flap 24 have a transitional region between the point of securement and the point of contact with seal ridge 30.

Valve seat 26 preferably is made from a relatively light-weight plastic that is molded into an integral one-piece body. The valve seat can be made by injection molding techniques. The surface of the seal ridge 30 that makes contact with the flexible flap 24 (the contact surface) is preferably fashioned to be substantially uniformly smooth to ensure that a good seal occurs. The contact surface preferably has a width great enough to form a seal with the flexible flap 24 but is not so wide as to allow adhesive forces caused by condensed moisture to significantly make the flexible flap 24 more difficult to open. The width of the contact surface, preferably, is at least 0.2 mm, and preferably is in the range of about 0.25 mm to 0.5 mm.

Flexible flap 24 preferably is made from a material that is capable of displaying a bias toward seal ridge 30 when the flexible flap 24 is secured to the valve seat 26 at surface 40. The flexible flap preferably assumes a flat configuration where no forces are applied and is elastomeric and is resistant to permanent set and creep. The flexible flap can be made from an elastomeric material such as a crosslinked natural rubber (for example, crosslinked polyisoprene) or a synthetic elastomer such as neoprene, butyl rubber, nitrile rubber, or silicone rubber. Examples of rubbers that may be used as flexible flaps include: compound number 40R149 available from West American Rubber Company, Orange, Calif.; compounds 402A and 330A available from Aritz-Optibelt-KG, Höxter, Germany; and RTV-630 available from General Electric Company, Waterford, N.Y. A preferred flexible flap has a stress relaxation sufficient to keep the flexible flap in an abutting relationship to the seal ridge under any static orientation for twenty-four hours at 70° C.; see European Standard for the European Committee for Standardization (CEN) Europäishe Norm (EN) 140 part 5.3 and 149 parts 5.2.2 for a test that measures stress relaxation under these conditions. The flexible flap preferably provides a leak-free seal according to the standards set forth in 30 C.F.R. §11.183-2 Jul. 1, 1991). A crosslinked polyisoprene is preferred because it exhibits a lesser degree of stress relaxation. The flexible flap typically will have a Shore A hardness of about 30 to 50.

Flexible flap 24 may be cut from a flat sheet of material having a generally uniform thickness. In general, the sheet has a thickness of about 0.2 to 0.8 mm; more typically 0.3 to 0.6 mm, and preferably 0.35 to 0.45 mm. The flexible flap is preferably cut in the shape of a rectangle, and has a free end 38 that is cut to correspond to the shape of the seal ridge 30 where the free end 38 makes contact therewith. For example, as shown in FIG. 1, free end 38 has a curved edge 42 corresponding to the circular seal ridge 30. By having the free end 38 cut in such a manner, the free end 38 weighs less and therefore can be lifted more easily from the seal ridge 30 during exhalation and closes more easily when the face mask is inverted. The flexible flap 24 preferably is greater than about 1 cm wide, more preferably in the range of about 1.2 to 3 cm wide, and is about 1 to 4 cm long. The secured end of the flexible flap typically will be about 10 to 25 percent of the total circumferential edge of the flexible flap, with the remaining 75 to 90 percent being free to be lifted from the valve seat 26. A preferred flexible flap of this invention is about 2.4 cm wide and about 2.6 cm long and has a rounded free end 38 with a radius of about 1.2 cm.

As best shown in FIGS. 1 and 4, a flange 43 extends laterally from the valve seat 26 to provide a surface onto which the exhalation valve 14 can be secured to the mask body 12. Flange 43 preferably extends around the whole perimeter of valve seat 26. When the mask body 12 is a fibrous filtration face mask, the exhalation valve 14 can be secured to the mask body 12 at flange 43 by sonic welds, adhesion bonding, mechanical clamping, or the like. It is preferred that the exhalation valve 14 be sonically welded to the mask body 12 of the filtering face mask 10.

A preferred unidirectional fluid valve of this invention is advantageous in that it has a single flexible flap 24 with one free end 38, rather than having two flaps each with a free end. By having a single flexible flap 24 with one free end 38, the flexible flap 24 can have a longer moment arm, which allows the flexible flap 24 to be more easily lifted from the seal ridge 30 by the dynamic pressure of a wearer's exhaled air. A further advantage of using a single flexible flap with one free end is that the exhaled air can be deflected downward to prevent fogging of a wearer's eyewear or face shield (e.g. a welder's helmet).

Figure 5:
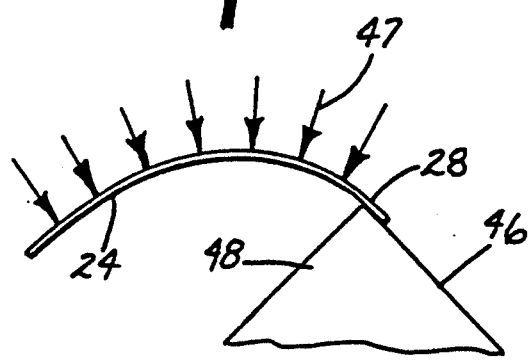
FIG. 5 is a side view of a flexible flap 24 suspended as a cantilever and being exposed to a uniform force.

FIG. 5 illustrates a flexible flap 24 deformed by applying a uniform force to the flexible flap. Flexible flap 24 is secured at a first portion 28 to a hold-down surface 46 and has for a second or free portion suspended therefrom as a cantilever beam. Surface 46 desirably is planar, and the flexible flap 24 is preferably secured to that planar surface along the whole width of portion 28. The uniform force includes a plurality of force vectors 47 of the same magnitude, each applied at a direction normal to the curvature of the flexible flap. The resulting deformation curve can be used to define the curvature of a valve seat's seal ridge 30 to provide a flexible flap that exerts a substantially uniform force upon the seal ridge.

Determining the curvature of a seal ridge 30 that provides a substantially uniform seal force is not easily done empirically. It can, however, be determined numerically using finite element analysis. The approach taken is to model a flexible flap secured at one end with a uniform force applied to the free end of the flexible flap. The applied force vectors are kept normal to the curvature of flexible flap 24 because the seal force executed by flexible flap 24 to the seal ridge 30 will act normal thereto. The deformed shape of flexible flap 24 when subjected to this uniform, normal force is then used to fashion the concave curvature of seal ridge 30.

Using finite elemental analysis, the flexible flap can be modelled in a two-dimensional finite element model as a bending beam fixed at one end, where the free end of the flexible flap is divided into numerous connected subregions or elements within which approximate functions are used to represent beam deformation. The total beam deformation is derived from linear combinations of the individual element behavior. The material properties of the flexible flap are used in the model. If the stress-strain behavior of the flexible flap material is non-linear, as in elastomeric materials, the Mooney-Rivlin model can be used (see, R. S. Rivlin and D. W. Saunders (1951), Phil. Trans. R. Soc. A243, 251–298 "Large Elastic Deformation of Isotropic Materials: VII Experiments on the Deformation of Rubber"). To use the Mooney-Rivlin model, a set of numerical constants that represent the stress/strain behavior of the flexible flap need to be determined from experimental test data. These constants are placed into the Mooney-Rivlin model which is then used in the two-dimensional finite element model. The analysis is a large deflection, non-linear analysis. The numerical solution typically is an iterative one, because the force vectors are kept normal to the surface. A solution is calculated based upon the previous force vector. The direction of the force vector is then updated and a new solution calculated. A converged solution is obtained when the deflected shape is not changing from one iteration to the next by more than a preset minimum tolerance. Most finite element analysis computer programs will allow a uniform force to be input as an elemental pressure which is ultimately translated to nodal forces or input directly as nodal forces. The total magnitude of the nodal forces may be equal to the mass of the free portion of the flexible flap multiplied by the acceleration of gravity acting on the mass of the flexible flap or any factor of gravity as so desired. Preferred gravitational factors are discussed below. The final X, Y position of the deflected nodes representing the flexible flap can be curve fit to a polynomial equation to define the shape of the concave seal ridge.

Figure 6:
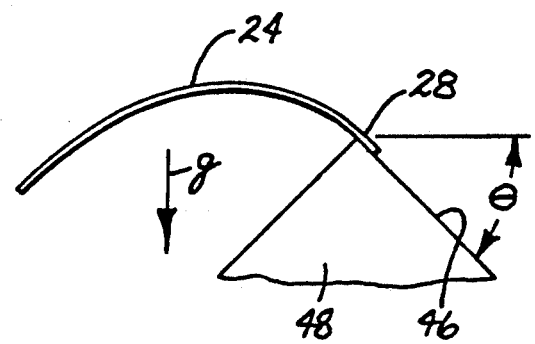
FIG. 6 is a side view of a flexible flap 24 suspended as a cantilever as being exposed to gravitational acceleration, g.
Figure 7:
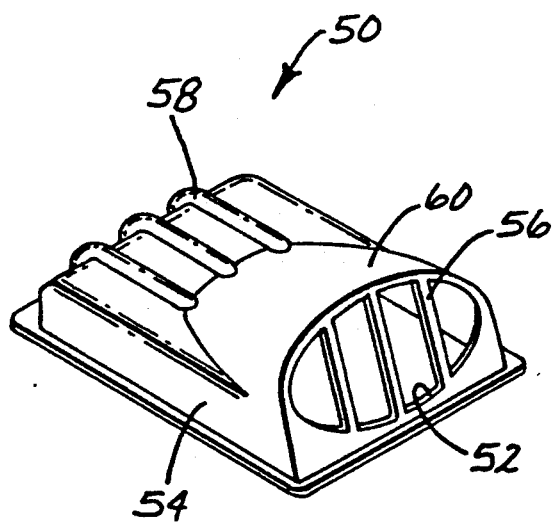
FIG. 7 is a perspective view of a valve cover 50 in accordance with the present invention.

FIG. 6 illustrates a flexible flap 24 being deformed by gravity, g. The flexible flap 24 is secured as a cantilever beam at end 28 to surface 46 of a solid body 48. Being secured in this fashion, flexible flap 24 displays a deformation curve caused by the acceleration of gravity, g. As indicated above, the side-elevational curvature of a valve seat's seal ridge can be fashioned to correspond to the deformation curve of the flexible flap 24 when exposed to a force in the direction of gravity which is equal to the mass of the free portion of the flexible flap 24 multiplied by at least one unit of gravitational acceleration, g.

A gravitational unit of acceleration, g, has been determined to be equal to a 9.807 meters per second per second (m/s$^2$). Although a seal ridge having a curvature that corresponds to a deformation curve exhibited by a flexible flap exposed to one g can be sufficient to hold the flexible flap in a closed position, it is preferred that the seal ridge have a curvature that corresponds to a deformation curve exhibited by a flexible flap that is exposed to a force caused by more than one g of acceleration, preferably 1.1 to 2 g. More preferably, the seal ridge has a curvature that corresponds to the flexible flap's deformation curve at from 1.2 to 1.5 g of acceleration. A most preferred seal ridge has a side-elevational curvature that corresponds to a deformation curve exhibited by a flexible flap exposed to a force caused by 1.3 g of acceleration. The additional gravitational acceleration is used to provide a safety factor to ensure a good seal to the valve seat at any face mask orientation, and to accommodate flap thickness variations and additional flap weight caused by condensed moisture.

In actual practice, it is difficult to apply a preload exceeding 1 g (e.g., 1.1, 1.2, 1.3 g etc.) to a flexible flap. The deformation curve corresponding to such amounts of gravitational acceleration, however, can be determined through finite element analysis.

To mathematically describe a flexible flap bending due to gravity, the two-dimensional finite element model is defined to be constrained at one end in all degrees of freedom. A set of algebraic equations are solved, yielding the beam deformation at the element nodes of interest, which, when combined, form the entire deformation curve. A curve-fit to these points gives an equation for the curve, and this equation can be used to generate the seal ridge curvature of the valve seat.

The versatility of finite element analysis is that the magnitude of the gravitational constant's acceleration and direction can be varied to create the desired preload on a flexible flap. For instance, if a pre-load of 10 percent of the weight of the flexible flap is needed, the deformation curve generated at 1.1 g would be used as the side-elevational curvature of the seal ridge. The direction may be changed by rotating the gravitational acceleration vector with respect to a horizontal hold-down surface or by rotating the hold-down surface with respect to the gravitational vector. Although a suitable deformation curve can be determined by having hold-down surface 46 parallel to the horizontal, it was found in the research leading to this design that the greatest deformation of the flexible flap 24 does not occur when the flexible flap 24 is supported at the horizontal, but when the flexible flap 24 is held elevated above the horizontal as shown in FIG. 5 and the hold-down surface 46 is at an angle $\theta$ in the range of 25 to 65 degrees. It was discovered that by rotating the hold-down surface at an angle to the horizontal, a deformation curve can be generated that closely approximates a deformation curve having been subjected to uniform forces normal to the curved flap. For a fixed flexible flap length, the best rotational angle $\theta$ is dependent upon the magnitude of the gravitational constant and the thickness of the flexible flap. In general, however, a preferred deformation curve can be displayed by having hold-down surface 46 at an angle $\theta$ of about 45 degrees.

The mathematical expression that defines the deformation curve of a flexible flap exposed to either a uniform force and/or a force of a factor of at least one unit of gravitational acceleration is a polynomial mathematical expression, typically a polynomial mathematical expression of at least the third order. The particular polynomial mathematical expression that defines the deformation curve can vary with respect to parameters such as flexible flap thickness, length, composition, and the applied force(s) and direction of those force(s).

Exhalation valve 14 can be provided with a valve cover to protect the flexible flap 24, and to help prevent the passage of contaminants through the exhalation valve. In FIG. 6, a valve cover 50 is shown which can be secured to exhalation valve 14 by a friction fit to wall 44. Valve cover 50 also can be secured to the exhalation valve 14 by ultrasonic welding, an adhesive, or other suitable means. Valve cover 50 has an opening 52 for the passage of a fluid. Opening 52 preferably is at least the size of orifice 32, and preferably is larger than orifice 32. The opening 52 is placed, preferably, on the valve cover 50 directly in the path of fluid flow 36 so that eddy currents are minimized. In this regard, opening 52 is approximately parallel to the path traced by the free end 38 of flexible flap 24 during its opening and closing. As with the flexible flap 24, the valve cover opening 52 preferably directs fluid flow downwards so as to prevent the fogging of a wearer's eyewear. All of the exhaled air can be directed downwards by providing the valve cover with fluid-impermeable side walls 54. Opening 52 can have cross-members 56 to provide structural support and aesthetics to valve cover 50. A set of ribs 58 can be provided on valve cover 50 for further structural support and aesthetics. Valve cover 50 can have its interior fashioned such that there are female members (not shown) that mate with pins 41 of valve seat 14. Valve cover 50 also can have a surface (not shown) that holds flexible flap 24 against flap-retaining surface 40. Valve cover 50 preferably has fluid impermeable ceiling 60 that increases in height in the direction of the flexible flap from the fixed end to the free end. The interior of the ceiling 60 can be provided with a ribbed or coarse pattern or a release surface to prevent the free end of the flexible flap from adhering to the ceiling 60 when moisture is present on the ceiling or the flexible flap. The valve cover design 50 is fully shown in U.S. Design patent application 29/000,382. Another valve cover that also may be suitable for use on a face mask of this invention is shown in Design patent application 29/000,384. The disclosures of these applications are incorporated here by reference.

Although the unidirectional fluid valve of this invention has been described for use as an exhalation valve, it also can be possible to use the valve in other applications, for example as an inhalation valve for a respirator or as a purge valve for garments or positive pressure helmets.

Advantages and other features of this invention are further illustrated in the following examples. It is to be expressly understood, however, that while the examples serve this purpose, the materials selected and amounts used, as well as other conditions and details, are not to be construed in a manner that would unduly limit the scope of this invention.

EXAMPLE 1 (FINITE ELEMENT ANALYSIS FLEXIBLE FLAP EXPOSED TO 1.3 G)

In this Example, finite element analysis was used to define the curvature of a valve seat's seal ridge. The curvature corresponded to the deformation curve exhibited by the free portion of a flexible flap after being exposed to 1.3 g of acceleration. The flexible flap was composed of a natural rubber compound containing 80 weight percent polyisoprene, 13 weight percent zinc oxide, 5 weight percent of a long-chain fatty acid ester as a plasticizer, stearic acid, and an antioxidant. The flexible flap had a material density of 1.08 grams per cubic centimeter (g/cm$^3$), an ultimate elongation of 670 percent, an ultimate tensile strength of 19.1 meganewtons per square meter, and a Shore A harness of 35. The flexible flap had a free-swinging length of 2.4 cm, a width of 2.4 cm, a thickness of 0.43 mm, and a rounded free end with a radius of 1.2 cm. The total length of the flexible flap was 2.8 cm. The flexible flap was subjected to a tensile test, a pure shear test, and a biaxial tension test to give three data sets of actual behavior. This data was converted to engineering stress and engineering strain. The Mooney-Rivlin constants were then generated using the finite element ABAQUS computer program (available from Hibbitt, Karlsson and Sorensen, Inc., Pawtucket, R.I.). After checking computer simulations of the stress/strain tests against the empirical data, the two Mooney-Rivlin constants were determined to be 24.09 and 3.398. These constants gave the closest numerical results to the actual data from the tests on the flexible flap material.

Input parameters describing the grid points, boundary conditions, and load were chosen, and those parameters and the Mooney-Rivlin constants were then inserted into the ABAQUS finite element computer program. The shape function of the individual elements was selected to be quadratic with mid-side nodes. The gravitational constant was chosen to be 1.3 g. The angle of rotation $\theta$ from the horizontal for a maximum deformation curvature was determined to be 34 degrees by rotating the gravitational vector. A regression of the data gave a curve for the valve seat defined by the following equation:

$$y = +0.052559x - 2.445429x^2 + 5.785336x^3 - 16.625961x^4 + 13.787755x^5$$

where x and y are the abscissa and the ordinate, respectively. The correlation coefficient squared was equal to 0.99, indicating an excellent correlation of this equation to the finite element analysis data.

A valve seat was machined from aluminum and was provided with a seal ridge that had a side-elevational curvature which corresponded to the above deformation curve. A circular orifice of 3.3 cm$^2$ was provided in the valve seat. The flexible flap was clamped to a flat flap-retaining surface. The flap-retaining surface was spaced 1.3 mm from the nearest portion of the orifice tangential to the curved seal ridge. The flap-retaining surface was 6 mm long, and traversed the valve seat for a distance of 25 mm. The curved seal ridge had a width of 0.51 mm. The flexible flap remained in an abutting relationship to the seal ridge no matter how the valve was oriented. The seal between the flexible flap and the valve seat was found to be leak-free.

The minimum force required to open this valve was then determined. This was accomplished by attaching the valve to a fluid-permeable mask body, taping the valve shut, and monitoring the pressure drop as a function of airflow volume. After a plot of pressure drop versus airflow was obtained for a filtering face mask with the valve taped shut, the same was done for the filtering face mask with the valve open. The two sets of data were compared. The point where the two sets of data diverged represented the initial opening of the valve. After many repetitions, the average opening pressure drop was determined to be 1.03 mm H$_2$O. This pressure was converted to the force to levitate the flexible flap by dividing the pressure needed to open the valve by the area of flexible flap within the orifice. The area of the flexible flap within the orifice was 3.49 cm$^2$. This gave an opening force of 0.00352 Newtons. The weight of the free-swinging part of the flexible flap was 0.00251 Newtons, and the ratio of the opening force to the weight gave an operational preload of 1.40 g. This quantity is close to the chosen gravitational constant 1.3 g, and the extra force may be taken to be the force needed to bend the flexible flap during opening.

EXAMPLE 2 (FINITE ELEMENT ANALYSIS FLEXIBLE FLAP EXPOSED TO A UNIFORM FORCE)

In this Example, finite element analysis was employed to define a valve seat where the flexible flap would exert a uniform force on the seal ridge of the valve seat. The flexible flap that was used in this Example was the same as the flexible flap of Example 1. The ABAQUS computer program of Example 1 was used in the finite element analysis. The analysis was a large deflection, non-linear analysis. The force factors that were used in the analysis were kept normal to the surface of the flexible flap. An iterative calculation was employed: a curve was calculated based on the previous force vectors, and that curve was updated and a new curve was then obtained. The converged numerical equation for the curve was obtained when the deformation curve did not change significantly from one iteration to the next. The final curvature was translated into the following fifth order, polynomial equation:

$$y = 0.01744x - 1.26190x^2 + 0.04768x^3 - 1.83595x^4 + 2.33781x^5$$

where x and y are the abscissa and ordinate, respectively.

EXAMPLE 3 (FINITE ELEMENT ANALYSIS: FLEXIBLE FLAP EXPOSED TO 1.3 g)

In this Example, as in Example 1, finite element analysis was used to define the curvature of a valve seat's seal ridge which corresponds to the curvature of a free portion of a flexible flap which was exposed to 1.3 g of acceleration. This Example differs from Example 1 in that the flexible flap was made from compound 330A, available from Aritz-Optibelt KG. The flexible flap had a material density of 1.07 grams per cubic centimeter ($g/cm^3$), an ultimate elongation greater than 600%, an ultimate tensile strength of 17 meganewtons per square meter, and a Shore A hardness of 47.5. The geometry of the flap was the same as for the flap in Example 1. When the rubber was subjected to the same testing as in Example 1, the Mooney-Rivlin constants were determined to be 53.47 and −0.9354. The first constant shows this material to be stiffer than that of Example 1, also shown in greater Shore A hardness.

When a 0.43 mm thick flap made from this material was installed on the valve seat of Example 1, the rubber sealed uniformly across the entire valve seat curve. However, because of the greater stiffness of this material, the opening pressure drop was slightly higher than the material in Example 1. When a thinner flap of 0.38 mm was installed to lower this pressure drop, this lower thickness did not lie uniformly across the valve seat, lifting up slightly in the middle of the curve. However, the flap could be made to lie uniformly and leak-free across the valve seat by either moving the flap-retaining surface closer or by slightly altering the curve of Example 1 to make it shallower.

The ABAQUS program was used in Example 1 to obtain deformation curves for this material. The gravitational constant was chosen to be 1.3 g to yield a deformation curve having a pre-load of 30 percent of the weight of the flexible flap. In this case, the angles of rotation θ from the horizontal for a maximum deformation curvature were determined to be 40 degrees and 32 degrees for the flap thicknesses of 0.38 mm and 0.43 mm, respectively. Regression of the data gave curves for the valve seat having the following fourth order polynomial equations, for 0.38 mm thick flap:

$$y = -0.03878x - 0.91868x^2 - 1.13096x^3 + 1.21551x^4$$

and for a 0.43 mm thick flap:

$$y = 0.00287x - 1.03890x^2 + 0.19674x^3 + 0.20014x^4$$

where x and y are the abscissa and ordinate, respectively.

These curves are shallower than the curve obtained for the rubber of Example 1, showing that the pre-load of the rubber of this Example when applied to the valve seat curve of Example 1 will be greater than 30 percent.

EXAMPLES 4-6

(Comparison of Valve of '362 Patent with Valve of this Invention)

In Examples 4-6, the exhalation valve of this invention was compared to the exhalation valve of the '362 patent. In Example 4, the exhalation valve of Example 1 was tested for the valve's airflow resistance force by placing the exhalation valve at the opening of a pipe having a cross-sectional area of 3.2 $cm^2$ and measuring the pressure drop with a manometer. An airflow of 85 l/min was passed through the pipe. The measured pressure drop was multiplied by the flexible flap's surface area over the orifice to obtain the airflow resistance force. The data gathered is set forth in Table 1.

Examples 5 and 6 correspond to examples 2 and 4 of the '362 patent, respectively. In examples 2 and 4 of the '362 patent, the length and width of the flaps were changed, and each valve was tested for its pressure drop at 85 liters per minute (l/min) through the same nozzle of Example 4.

TABLE 1

| Example | Orifice Area ($cm^2$) | Pressure Drop (Pascals) | Airflow Resistance Force (Newtons) |
|---|---|---|---|
| 4 | 5.3 | 26.46 | 0.0140 |
| 5* | 5.3 | 60.76 | 0.0322 |
| 6* | 13.5 | 17.64 | 0.0238 |

*Comparative examples corresponding to examples 2 and 4 of the '362 patent, respectively.

In Table 1, the data demonstrates that the exhalation valve of this invention (Example 4) has less airflow resistance force than the exhalation valve of the '362 patent (Examples 5-6).

EXAMPLE 7 (ASPIRATION EFFECT)

In this Example, a normal exhalation test was employed to demonstrate how an exhalation valve of this invention can create a negative pressure inside a face mask during exhalation.

A "normal exhalation test" is a test that simulates normal exhalation of a person. The test involves mounting a filtering face mask to a 0.5 centimeter (cm) thick flat metal plate that has a circular opening or nozzle of 1.61 square centimeters ($cm^2$) (9/16 inch diameter) located therein. The filtering face mask is mounted to the flat, metal plate at the mask base such that airflow passing through the nozzle is directed into the interior of the mask body directly towards the exhalation valve (that is, the airflow is directed along the shortest straight line distance from a point on a plane bisecting the mask base to the exhalation valve). The plate is attached horizontally to a vertically-oriented conduit. Air flow sent through the conduit passes through the nozzle and enters the interior of the face mask. The velocity of the air passing through the nozzle can be determined by dividing the rate of airflow (volume/time) by the cross-sectional area of the circular opening. The pressure drop can be determined by placing a probe of a manometer within the interior of the filtering face mask.

The exhalation valve of Example 1 was mounted to a 3M 8810 filtering face mask such that the exhalation valve was positioned on the mask body directly opposite to where a wearer's mouth would be when the mask is worn. The airflow through the nozzle was increased to approximately 80 l/min to provide an airflow velocity of 0.9 meters per second (m/s). At this velocity, zero pressure drop was achieved inside the face mask. An ordinary person will exhale at moderate to heavy work rates at an approximate air velocity of about 0.5 to 1.3 m/s depending on the opening area of the mouth. Negative and relatively low pressures can be provided in a face mask of this invention over a large portion of this range of air velocity.

EXAMPLES 8-13

(Filtering Face Mask of this Invention—Measure of Pressure Drop and Percent Total Flow Through the Exhalation Valve as a Function Total Airflow Through Face Mask)

The efficiency of the exhalation valve to purge breath as a percentage of total exhalation flow at a certain pressure drop is a major factor affecting wearer comfort. In Examples 7-12, the exhalation valve of Example 1 was tested on a 3M 8810 filtering face mask, which at 80 l/min flow has a pressure drop of about 63.7 pascals. The exhalation valve was positioned on the mask body directly opposite to where a wearer's mouth would be when the mask is worn. The pressure drop through the valve was measured as described in Example 7 at different vertical volume flow rates, using airflow nozzles of different cross-sectional areas.

The percent total flow was determined by the following method. First, the linear equation describing the filter media volume flow ($Q_f$) relationship with the pressure drop ($\Delta P$) was found with the valve held closed by correlating experimental data from positive and negative pressure drop data (note: when the pressure drop is positive, $Q_f$ is also positive. The pressure drop with the valve allowed to open was then measured at a specified exhalation volume flow ($Q_T$). The flow through the valve alone ($Q_V$) is calculated as $Q_V = Q_T - Q_f$, with $Q_f$ calculated at that pressure drop. The percent of the total exhalation flow through the valve is calculated by $100(Q_T - Q_f)/Q_T$. If the pressure drop on exhalation is negative, the inward flow of air through the filter media into face mask will also be negative, giving the condition that the flow out through the valve orifice $Q_V$ is greater than the exhalation flow $Q_T$. The data for pressure drop and percent total flow are set forth in Table 2.

TABLE 2

| Examples | Volume Flow (liters/minute) | Pressure Drop (Pa) Nozzle Area: 1.81 cm | Pressure Drop (Pa) Nozzle Area: 2.26 cm$^2$ | Pressure Drop (Pa) Nozzle Area: 0.96 cm$^2$ | % Total Flow Nozzle Area: 18.1 cm$^2$ | % Total Flow Nozzle Area: 2.26 cm$^2$ | % Total Flow Nozzle Area: 0.95 cm$^2$ |
|---|---|---|---|---|---|---|---|
| 8 | 12 | 9.02 | 8.92 | 8.92 | 1 | 2 | 2 |
| 9 | 24 | 15.09 | 14.21 | 11.17 | 19 | 24 | 39 |
| 10 | 48 | 18.62 | 14.99 | 4.31 | 30 | 60 | 87 |
| 11 | 60 | 20.48 | 15.09 | −1.76 | 56 | 68 | 102 |
| 12 | 72 | 22.34 | 14.80 | −7.55 | 61 | 73 | 112 |
| 13 | 80 | 24.01 | 14.41 | −12.94 | 62 | 77 | 119 |

In Table 2, the data shows that for low momentum airflows an increase in airflow causes an increase in pressure drop (18.1 cm$^2$ nozzle). Low momentum airflows are rare in typical face mask usage. Nonetheless, the percent total flow is greater than 50 percent at above approximately 30 l/min (Examples 10-13). A typical person will exhale at about 25 to 90 l/min depending on the person's work rate. On average, a person exhales at about 32 l/min. Thus, the face mask of this invention provides good comfort to a wearer at low momentum airflows.

At higher momentum airflows (obtained using a 2.26 cm$^2$ nozzle), an increase in airflow causes a lower pressure drop than the 18.1 cm$^2$ nozzle. As the airflow is increased, the effect of aspiration becomes apparent as the pressure drop reaches a maximum and then begins to decrease with increasing airflow. The percent total flows through the exhalation valve increase with higher airflows to greater than 70 percent, thereby providing better comfort to the wearer.

At the highest momentum airflows (using a 0.95 cm$^2$ nozzle), the pressure drop increases slightly and then decreases to negative quantities as airflow increases. This is the aspiration effect and is shown in Table 2 as percent total flow quantities that are greater than 100 percent. For instance, in Example 13 the percent total flow at 80 l/min is 119 percent; where 19 percent of the total volume flow is drawn through the filter media into the interior of the face mask and is expelled out through the exhalation valve.

Various modifications and alterations of this invention may become apparent to those skilled in the art without departing from the invention's scope. It therefore should be understood that the invention is not to be unduly limited to the illustrated embodiments set forth above but is to be controlled by the limitations set forth in the claims and any equivalents thereof.

What is claimed is:

1. A unidirectional fluid valve that comprises:
   a flexible flap having a first portion and a second portion, the first portion being attached to a valve seat, the valve seat having an orifice and a seal ridge that has a concave curvature when viewed from a side elevation, the flexible flap making contact with the concave curvature of the seal ridge when a fluid is not passing through the orifice, the second portion of the flexible flap being free to be lifted from the seal ridge when a fluid is passing through the orifice, wherein the concave curvature of the seal ridge corresponds to a deformation curve exhibited by the second portion of the flexible flap when exposed to (i) a uniform force that acts along the length of the deformation curve normal thereto, (ii) a force acting in the direction of gravity having a magnitude equal to a mass of the second portion of the flexible flap multiplied by at least one gravitational unit of acceleration, or a combination of (i) and (ii).

2. The unidirectional fluid valve of claim 2, wherein the concave curvature corresponds to a deformation curve exhibited by the flexible flap when exposed to a uniform force that is not less than the mass of the second portion of the flexible flap multiplied by at least one gravitational unit of acceleration.

3. The unidirectional fluid valve of claim 2, wherein the concave curvature corresponds to a deformation curve exhibited by the flexible flap when exposed to a uniform force in the range of the mass of the second portion of the flexible flap multiplied by 1.1 to 1.5 g of acceleration.

4. The unidirectional fluid valve of claim 1, wherein the flexible flap has a stress relaxation sufficient to keep the second portion of the flexible flap in leak-free contact to the seal ridge under any static orientation for twenty-four hours at 70° C. when a fluid is not passing through the orifice.

5. The unidirectional fluid valve of claim 1, wherein the flexible flap comprises crosslinked polyisoprene, is 0.35 to 0.45 millimeters thick, and has a Shore A hardness of 30 to 50.

6. The unidirectional fluid valve of claim 1, wherein the first portion of the flexible flap is attached to the valve seat beyond the area encompassed by the orifice.

7. The unidirectional fluid valve of claim 1, wherein the concave curvature of the seal ridge is defined by a polynomial mathematical equation of at least the third order.

8. The unidirectional fluid valve of claim 1, wherein the orifice has a cross-sectional area in the range of 2 to 6 cm$^2$ when viewed from a plane perpendicular to the direction of fluid flow.

9. The unidirectional fluid valve of claim 8, wherein the orifice is 3 to 4 cm$^2$ in size.

10. The unidirectional fluid valve of claim 1, wherein the first portion of the flexible flap is attached to a flap-retaining surface located on the exterior of the orifice beyond an outer extremity of the curved seal ridge, the point attachment being 1 to 3.5 mm from the curved seal ridge.

11. The unidirectional fluid valve of claim 10, wherein the flap-retaining surface traverses the valve seat over a distance at least as great as the width of the orifice, and the flap-retaining surface extends in a straight line in the direction to which the surface traverses the valve seat.

12. The unidirectional fluid valve of claim 1, wherein the concave curvature corresponds to the deformation curve exhibited by the second portion of the flexible flap when exposed to a force acting in the direction of gravity and having magnitude equal to a mass of the second portion of the flexible flap multiplied by 1.1 to 2 g of acceleration.

13. The unidirectional fluid valve of claim 12, wherein the concave curvature corresponds to the deformation curve exhibited by the second portion of the flexible flap when exposed to a force having a magnitude equal to a mass of the second portion of the flexible flap multiplied by 1.2 to 1.5 g of acceleration.

14. The unidirectional fluid valve of claim 13, wherein the concave curvature corresponds to the deformation curve exhibited by the flexible flap when exposed to a force having a magnitude equal to a mass of the second portion of the flexible flap multiplied by 1.3 g of acceleration.

15. The unidirectional fluid valve of claim 12, wherein the deformation curve corresponds to the deformation curve exhibited by the second portion of the flexible flap when secured at the first portion at an angle $\theta$ to the horizontal in the range of 25 to 65 degrees.

16. The unidirectional fluid valve of claim 15, wherein the angle $\theta$ is about 45°.

* * * * *

UNITED STATES PATENT AND TRADEMARK OFFICE
CERTIFICATE OF CORRECTION

PATENT NO. : 5,325,892
DATED : July 5, 1994
INVENTOR(S) : Daniel A. Japuntich et al.

It is certified that error appears in the above-indentified patent and that said Letters Patent is hereby corrected as shown below:

Col. 2, line 8, "shaped" should be --shape--.

Col. 5, line 13, "198" should be --18--.

Col. 17, line 8, "2" should be --1--.

Col. 17, line 14, "2" should be --1--.

Col. 18, line 13, before "surface" insert --flap-retaining--.

Signed and Sealed this

Eighth Day of November, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.: 5,325,892

DATED: July 5, 1994

INVENTOR(S): Daniel A. Japuntich et al.

It is certified that error appears in the above-identified patent and that said Letters Patent is hereby corrected as shown below:

Col. 2, line 29, "0.8" should read --8--.

Col. 15, line 27, "0.9" should read --8.3--.

Col. 15, line 30, "0.5 to 1.3" should read --5 to 13--.

Col. 16, in Table 2, Column 3 heading, "1.81 cm" should read --18.1 cm$^2$--.

Signed and Sealed this

Second Day of June, 1998

Attest:

BRUCE LEHMAN

Attesting Officer

Commissioner of Patents and Trademarks